(12) United States Patent
Thom et al.

(10) Patent No.: US 8,924,737 B2
(45) Date of Patent: Dec. 30, 2014

(54) DIGITAL SIGNING AUTHORITY DEPENDENT PLATFORM SECRET

(75) Inventors: Stefan Thom, Snohomish, WA (US);
Robert Karl Spiger, Seattle, WA (US);
Magnus Bo Gustaf Nyström, Sammamish, WA (US); David R. Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 191 days.

(21) Appl. No.: 13/218,029

(22) Filed: Aug. 25, 2011

(65) Prior Publication Data
US 2013/0054946 A1 Feb. 28, 2013

(51) Int. Cl.
*G06F 21/60* (2013.01)
*G06F 21/62* (2013.01)
*G06F 21/57* (2013.01)

(52) U.S. Cl.
CPC ............ *G06F 21/575* (2013.01); *G06F 21/602* (2013.01)
USPC ............................ 713/187; 713/188; 713/189

(58) Field of Classification Search
CPC .................................. G06F 21/60; G06F 21/62
USPC .................................................. 713/187–189
See application file for complete search history.

(56) References Cited

U.S. PATENT DOCUMENTS

| | | | |
|---|---|---|---|
| 7,216,369 B2 * | 5/2007 | Wiseman et al. ................ 726/34 |
| 7,458,002 B2 * | 11/2008 | Fischer et al. ................ 714/746 |
| 7,565,552 B2 * | 7/2009 | Feilen et al. ................... 713/189 |
| 7,774,596 B2 | 8/2010 | Flynn | |
| 7,934,209 B2 | 4/2011 | Zimmer et al. | |
| 7,970,135 B1 * | 6/2011 | Schwenk ......................... 380/46 |
| 2004/0025036 A1 | 2/2004 | Balard et al. | |
| 2005/0262571 A1 | 11/2005 | Zimmer et al. | |
| 2007/0006169 A1 * | 1/2007 | Iliev et al. ...................... 717/131 |
| 2007/0127719 A1 * | 6/2007 | Selander et al. .............. 380/277 |
| 2009/0025067 A1 | 1/2009 | Holt et al. | |
| 2009/0319806 A1 | 12/2009 | Smith et al. | |
| 2009/0327741 A1 | 12/2009 | Zimmer et al. | |
| 2010/0161998 A1 | 6/2010 | Chen et al. | |
| 2010/0169631 A1 | 7/2010 | Yao et al. | |
| 2011/0307712 A1 * | 12/2011 | Sakthikumar et al. ........ 713/189 |

OTHER PUBLICATIONS

Roder et al., "Hades—Hardware Assisted Document Security", Second Workshop on Advances in Trusted Computing (WATC 2006 Fall), pp. 1-13.*
Du, et al., "Ensemble of Trusted Firmware Services based on TPM", Retrieved at <<http://www.aicit.org/jdcta/ppl/17_%20JDCTA_March_2-21.pdf>>, International Journal of Digital Content Technology and its Applications, vol. 5, No. 3, Mar. 2011, pp. 175-184.
"Windows Vista SP1 Detailed Changes (Changelog)", Retrieved at <<http://www.mydigitallife.info/windows-vista-sp1-detailed-changes-changelog/>>, Dec. 9, 2007, pp. 7.
"International Search Report", Mailed Date: Dec. 6, 2012, Application No. PCT/US2012/049880, Filed Date: Aug. 8, 2012, pp. 8, (MS# 333131.02).

* cited by examiner

*Primary Examiner* — William Powers
(74) *Attorney, Agent, or Firm* — Timothy Churna; Kate Drakos; Micky Minhas

(57) ABSTRACT

In accordance with one or more aspects, a representation of a configuration of a firmware environment of a device is generated. A secret of the device is obtained, and a platform secret is generated based on both the firmware environment configuration representation and the secret of the device. One or more keys can be generated based on the platform secret.

20 Claims, 7 Drawing Sheets

DIGITAL SIGNING AUTHORITY DEPENDENT PLATFORM SECRET

BACKGROUND

Computers have become increasingly commonplace and are oftentimes used to store data that a user of the computer desires to keep private. However, computers can be the target of attacks by malicious programs that can perform a variety of undesirable actions, such as accessing the data that a user desires to keep private. It remains difficult to protect computers against such malicious programs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a representation of a configuration of a firmware environment of a device is generated. A secret of the device is obtained, and a platform secret is generated based on both the firmware environment configuration representation and the secret of the device.

In accordance with one or more aspects, a platform secret generated based at least in part on both a secret of a device and a representation of a configuration of a firmware environment of the device is obtained. Based on the platform secret, one or more keys are generated.

BRIEF DESCRIPTION OF THE DRAWINGS

The same numbers are used throughout the drawings to reference like features.

DETAILED DESCRIPTION

Figure 1:
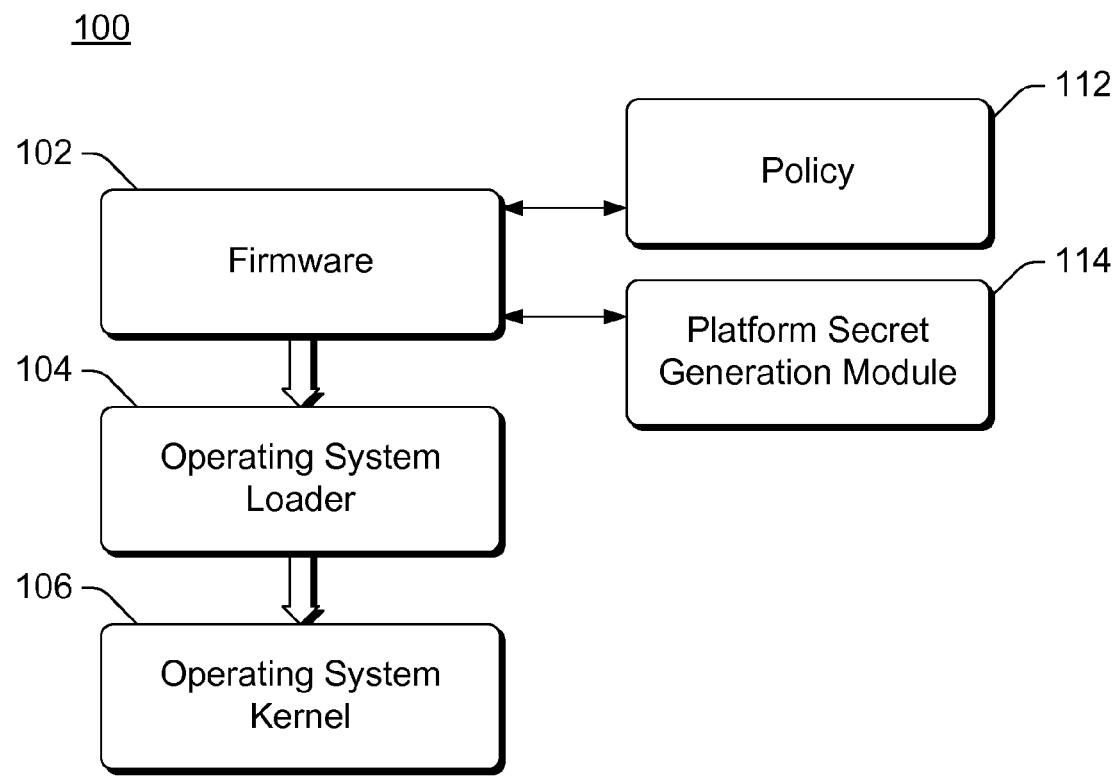
FIG. 1 illustrates an example device implementing the digital signing authority dependent platform secret in accordance with one or more embodiments.

A digital signing authority dependent platform secret is discussed herein. During a process of booting a device, one or more firmware components are loaded on the device and a representation of a configuration of the firmware environment of the device is generated. The firmware environment configuration representation can take various forms, such as one or more of a list of authorities that includes an identifier of each authority that digitally signed (or could have digitally signed) at least one of the firmware components that was loaded, an identification of authorities permitted to modify the list of acceptable authorities that can digitally sign components, a revocation record identifying authorities that are not permitted to verify a component and/or identifiers of particular components that are not permitted to be loaded, an identifier of an authority that digitally signed an operating system loader, and so forth. A secret of the device is also obtained, which is typically a key that is included in a processor or other part of the device. The firmware environment configuration representation is combined with the secret of the device to generate a platform secret. This platform secret can then be used as a basis for generating keys or other values used by the device. Such keys or other values are thus tied to the particular device (based on the secret of the device) and the authorities that digitally signed the firmware components that were loaded (as identified by the list of authorities).

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

FIG. 1 illustrates an example device 100 implementing the digital signing authority dependent platform secret in accordance with one or more embodiments. Device 100 can be a variety of different types of devices, such as a physical device or a virtual device. For example, device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Device 100 can also be a virtual device, such as a virtual machine running on a physical device. A virtual machine can be run on any of a variety of different types of physical devices (e.g., any of the various types listed above). Thus, device 100 may range from a full resource device with substantial memory and processor resources (e.g., personal computers, game consoles) to a low-resource device with limited memory and/or processing resources (e.g., traditional set-top boxes, handheld game consoles).

When device 100 is powered on or otherwise reset, device 100 boots. Booting of device 100 refers to the beginning operation of device 100, typically loading and executing an operating system of device 100. The booting of device 100 typically includes at least two stages. In the first stage, components of a pre-operating system environment are loaded and run on device 100. In the pre-operating system environment, various components or modules run performing various operations including booting the operating system. In the second stage, components of the operating system environment are loaded and run on device 100. In the operating system environment, the operating system is running on device 100.

Loading of a component refers to copying the component into a volatile (or alternatively nonvolatile) memory, and optionally performing additional configurations to other components or data stores. Executing a component refers to the running of (execution of) the instructions of the component by a processor or controller of device 100. After device 100 is booted, various other programs can be run on device 100 by the operating system.

During the boot process, firmware 102 is loaded and executed by device 100. Firmware 102 can be obtained from various sources, such as a nonvolatile memory of device 100, removable media coupled to device 100, another device coupled to device 100 (e.g., via a network), and so forth. Firmware 102 loads and executes operating system loader 104. Operating system loader 104 loads and executes operating system kernel 106. Operating system kernel 106 can then proceed to load and execute a variety of additional operating system components and/or user mode components. These operating system components and user mode components can be executed in response to a user request to execute such a component or in response to a request from another component or module.

In a secure boot configuration, firmware 102 includes multiple components that are verified before being loaded (and/or before being executed). A component can be verified in different manners, such as by verifying that the component has been digitally signed by an acceptable authority, verifying that the component is not identified as being prohibited from being loaded, verifying that the component has various characteristics or properties, and so forth. As used herein, an authority refers to an entity that generates a digital signature, such as a publisher or distributor of a component, a trusted third party, a reseller of a component, and so forth. Policy 112 includes criteria indicating which components of firmware 102 can be loaded and/or executed, and is used to verify the components of firmware 102 before being loaded and/or executed. Policy 112 can include various criteria, such as a list (or location from which a list can be obtained) that identifies acceptable authorities that can digitally sign components, a list (or location from which a list can be obtained) that identifies components that are prohibited from being loaded, and so forth.

Device 100 also includes a platform secret generation module 114. Module 114 generates a platform secret that is based on both the particular device 100 and a representation of a configuration of the firmware environment of device 100. The firmware environment configuration representation can include, for example, a list of authorities that digitally signed (or could have digitally signed) components of firmware 102, an identification of authorities permitted to modify the list of acceptable authorities in policy 112 that can digitally sign components, a revocation record identifying authorities that are not permitted to verify a component of firmware 102 and/or identifiers of particular components that are not permitted to be loaded as firmware 102, an identifier of an authority that digitally signed operating system loader 104, and so forth. The platform secret is a secret value tied to a particular combination of device and firmware environment configuration representation of the device. The firmware environment configuration representation and generation of the platform secret is discussed in more detail below.

In one or more embodiments, firmware 102 and operating system loader 104 are implemented as part of a pre-execution environment (also referred to as a pre-boot environment or pre-operating system environment), which refers to an environment running on device 100 before the operating system has finished booting and is running. In such embodiments, firmware 102 and operating system loader 104 can be stored on device 100 (e.g., in read only memory (ROM) or Flash memory), such as on a network interface card of device 100. Alternatively, firmware 102 and operating system loader 104 can be obtained from another device or service during the pre-execution environment. For example, firmware 102 and operating system loader 104 can be included as part of a boot image provided to device 100 from another device or service.

The pre-execution environment can be implemented in a variety of different manners and can be based on a variety of different conventional techniques. For example, the pre-execution environment can be implemented in accordance with the Unified Extensible Firmware Interface (UEFI) standard version 2.3 or other versions. By way of another example, the pre-execution environment can be implemented in accordance with the Preboot eXecution Environment (PXE) standard version 2.0 or other versions. By way of yet another example, the pre-execution environment can be implemented using a variety of different personal computer basic input/output system (BIOS) versions.

Figure 2:
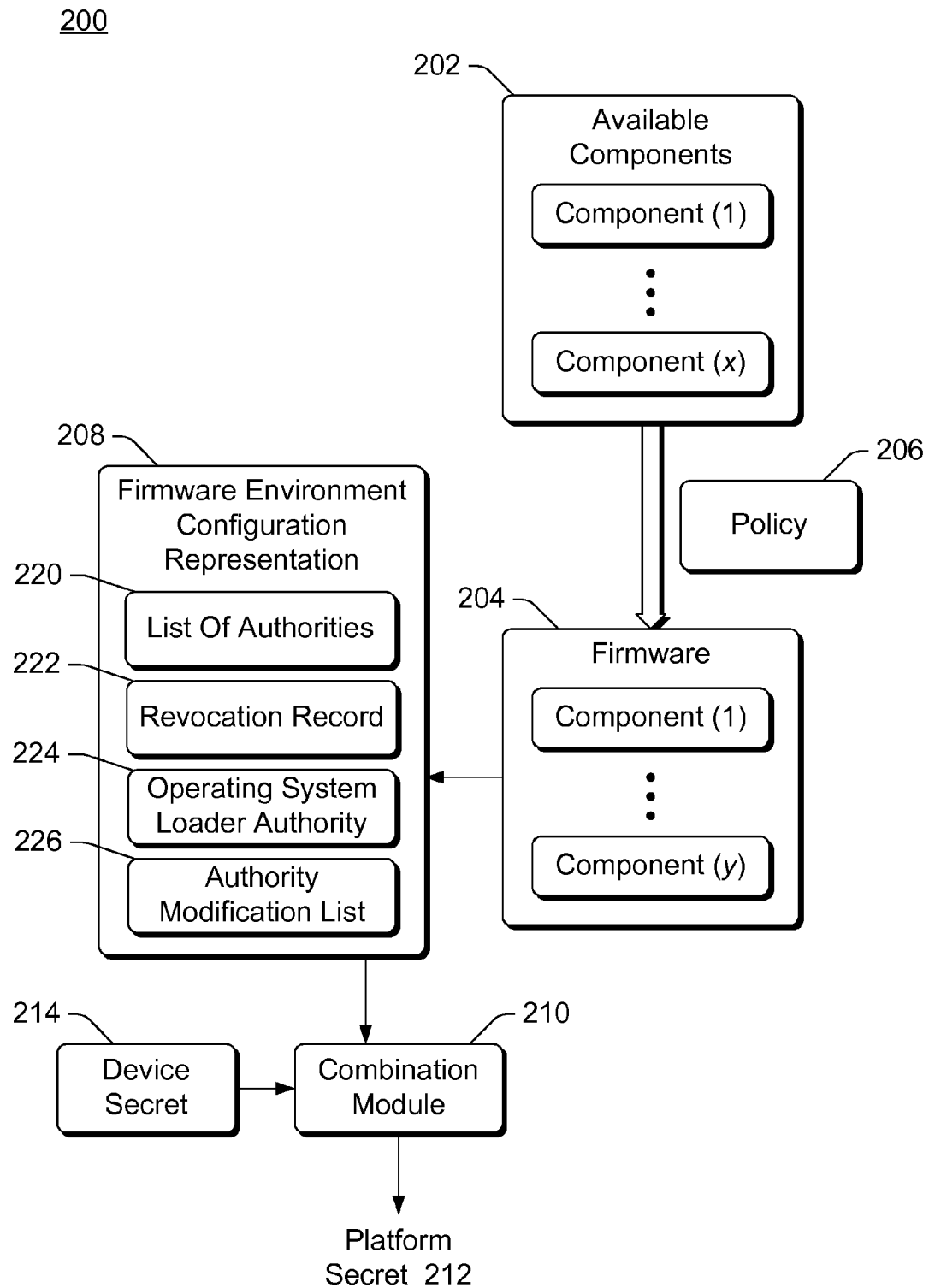
FIG. 2 illustrates an example system implementing the digital signing authority dependent platform secret in accordance with one or more embodiments.

FIG. 2 illustrates an example system 200 implementing the digital signing authority dependent platform secret in accordance with one or more embodiments. System 200 (except optionally available components 204) is included as part of a device, such as device 100 of FIG. 1. During the boot process, selected ones of available components 202 are loaded as firmware components 204. Available components 202 are those components that can be obtained and loaded as firmware components 204, although not all available components 202 need be actually loaded as firmware components 204. Which available components 202 are loaded as firmware components 204 can be identified in different manners, such as based on what hardware is included as part of or is coupled to the device implementing system 200, based on the configuration of particular ones of firmware components 204, and so forth. The selected available components 202 can be obtained from local storage devices, other devices and services, and so forth as discussed above.

An available component 202, before being loaded as a firmware component 204, is verified. In one or more embodiments, a particular component (e.g., an initial component loaded) manages the verification of other loaded firmware components 204. This particular component can, for example, be stored on a non-writeable storage device or otherwise stored in a manner that protects the component from being tampered with. Alternatively, multiple firmware components 204 can manage the verification of other loaded firmware components 204. For example, an initial component can be stored on a non-writeable storage device or otherwise stored in a manner that protects the component from being tampered with, and that initial component can verify and load one or more additional firmware components 204. Each of those one or more additional firmware components 204 can, in turn, verify and load one or more other firmware components 204, and so forth.

Policy 206 includes various criteria for verifying components of firmware 204. In one or more embodiments, policy 206 includes a record of acceptable authorities, and a revocation record (a record of revoked or otherwise unacceptable authorities and/or components). These records can take various forms, such as one or more lists, one or more databases, and so forth. The record of acceptable authorities includes identifiers of authorities that are permitted to verify a component. The revocation record includes identifiers of authorities that are not permitted to verify a component and/or identifiers of particular components that are not permitted to be loaded. The identifiers of authorities (whether acceptable or revoked) can take various forms, such as a public key of the authority, a public key that chains to a public key of the authority, and so forth. The identifier of a particular component can also take various forms, such as a hash value generated by applying a hash function to the component.

If a component is not digitally signed by an acceptable authority, is signed by an authority identified in the revocation record, and/or an identifier of the component is included in the revocation record, then the component is not verified. If a component is digitally signed by an acceptable authority then the component is verified (unless the authority that digitally signed the component is also identified in the revocation record, and/or an identifier of the component is included in the revocation record).

A firmware environment configuration representation 208 is generated that indicates the configuration of the firmware environment of the device implementing system 200. The configuration of the firmware environment can include various information and generally refers to authorities relied on in loading firmware components 204 and/or firmware components 204 that are not permitted to be loaded as firmware components 204. Firmware environment configuration representation 208 includes a list of authorities 220, a revocation record 222, an operating system loader authority 224, and/or an authority modification list 226. List of authorities 220 is a list of authorities that digitally signed (or could have digitally signed) firmware components 204. Revocation record 222 is a record of authorities that are not permitted to verify a firmware component 204 and/or identifiers of particular components that are not permitted to be loaded as firmware components 204. Operating system loader authority 224 is an identifier of an authority that digitally signed an operating system loader (e.g., operating system loader 104 of FIG. 1), and so forth. Authority modification list 226 is an identification of authorities permitted to modify the list of acceptable authorities that can digitally sign components When a component is loaded as a firmware component 204, an identifier of the authority that digitally signed the component can be added (e.g., by the component verifying the component) to list of authorities 220. Although referred to as a list, the list of authorities can alternatively be a database or other record.

In one or more embodiments, an identifier of the authority that digitally signs a component is added to list of authorities 220 for each firmware component 204. In such embodiments, list of authorities 220 is thus a list of the authorities that digitally signed components loaded as firmware components 204 in the order those firmware components 204 were loaded.

Figure 3:
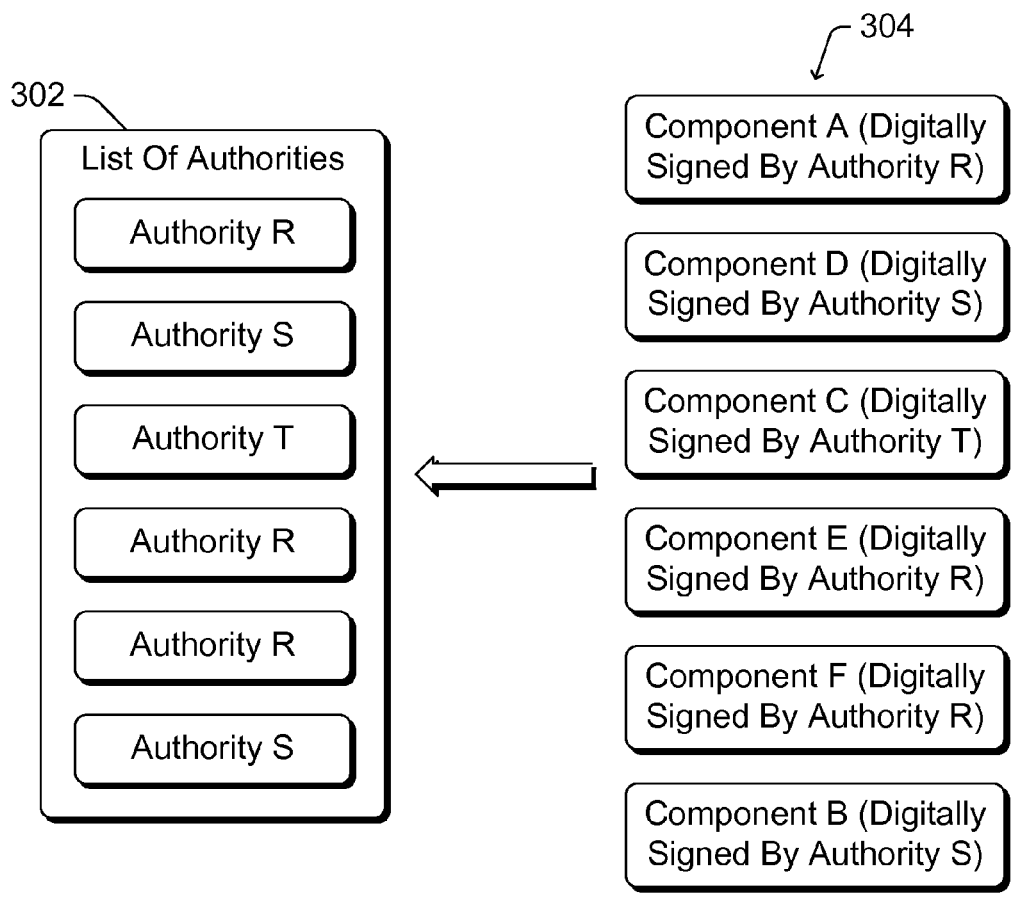
FIG. 3 illustrates an example list of authorities in accordance with one or more embodiments.

FIG. 3 illustrates an example list of authorities 302 in accordance with one or more embodiments. List of authorities 302 can be, for example, a list of authorities 220 of FIG. 2. Multiple components 304 are illustrated in the order in which they are loaded as firmware components, and also identifying the authority that digitally signed each component. Thus, six firmware components are loaded in the following order: Component A, Component D, Component C, Component E, Component F, and Component B. Components A, E, and F were digitally signed by Authority R, Components B and D were digitally signed by Authority S, and Component C was digitally signed by Authority T. List of authorities 302 is a list of the authorities that digitally signed components loaded as firmware components 204 in the order those firmware components 204 were loaded. Thus, the list of authorities 302 is the list Authority R, Authority S, Authority T, Authority R, Authority R, Authority S.

Returning to FIG. 2, in other embodiments an identifier of the authority that digitally signs a component is added to list of authorities 220 only if the identifier of the authority is not already included in list of authorities 220; if an identifier of the authority is already included in list of authorities 220 then another identifier of the authority need not be added to list of authorities 220. In such embodiments, list of authorities 220 is thus a list of the authorities that each digitally signed at least one of firmware components 204 regardless of which components those one or more authorities digitally signed and regardless of how many components those one or more authorities digitally signed.

Figure 4:
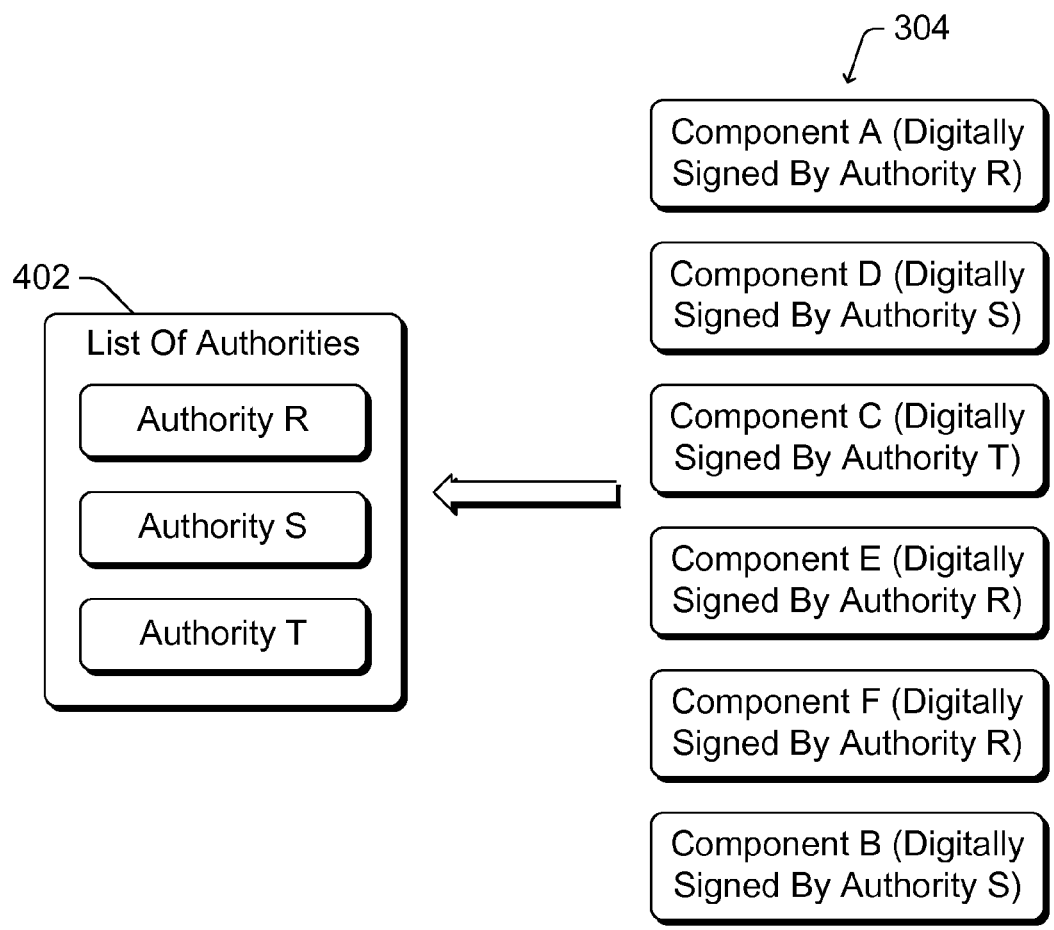
FIG. 4 illustrates another example list of authorities in accordance with one or more embodiments.

FIG. 4 illustrates another example list of authorities 402 in accordance with one or more embodiments. List of authorities 402 can be, for example, a list of authorities 220 of FIG. 2. Multiple components 304 are illustrated in the order in which they are loaded as firmware components, analogous to the discussion regarding FIG. 3. List of authorities 402 is a list of the authorities that each digitally signed at least one of firmware components 204 regardless of which components those one or more authorities digitally signed and regardless of how many components those one or more authorities digitally signed. Thus, the list of authorities 302 is the list Authority R, Authority S, Authority T.

Returning to FIG. 2, list of authorities 220 can alternatively be the record of acceptable authorities from policy 206. Thus, rather than identifying which authorities digitally signed firmware components 204, list of authorities 220 identifies authorities that could have digitally signed firmware components 204 regardless of whether those authorities actually did digitally sign one or more firmware components 204.

Firmware environment configuration representation 208 can also include as revocation record 222 the revocation record from policy 206. Thus, firmware environment configuration representation 208 can include identifiers of authorities that are not permitted to verify a component and/or identifiers of particular components that are not permitted to be loaded.

Firmware environment configuration representation 208 can also include operating system loader authority 224. Operating system loader authority 224 is an identifier of an authority that digitally signed an operating system loader (e.g., operating system loader 104 of FIG. 1) loaded on the device implementing system 200.

Firmware environment configuration representation 208 can also include an authority modification list 226. Authority modification list 226 is an identification (e.g., list) of authorities permitted to modify the list of acceptable authorities that can digitally sign components (e.g., are permitted to modify policy 206).

Additionally, although a single firmware environment configuration representation 208 is illustrated in system 200, it should be noted that any number of firmware environment configuration representations 208 can be included in system 200. For example, one firmware environment configuration representation can include a list of the authorities that digitally signed components loaded as firmware components 204 in the order those firmware components 204 were loaded, and another can include a list of the authorities that each digitally signed at least one of firmware components 204 regardless of which components those one or more authorities digitally signed and regardless of how many components those one or more authorities digitally signed. By way of another example, one firmware environment configuration representation can include a list of authorities and an operating system loader authority, another firmware environment configuration representation can include a list of authorities and a revocation record, and another firmware environment configuration representation can include a list of authorities and a revocation record.

Furthermore, it should be noted that although specific examples of information that can be included in firmware environment configuration representation 208 are discussed herein and illustrated in system 200, other information can also be included in firmware environment configuration representation 208.

Firmware environment configuration representation 208 is provided to or otherwise made available to a combination module 210. Combination module 210 can be included as one of firmware components 204, or alternatively can be implemented in different manners. Combination module 210 uses firmware environment configuration representation 208 in generating a platform secret 212. Combination module 210 can use firmware environment configuration representation 208 as is (that is, in the form in which it was generated) or alternatively can modify the information in firmware environment configuration representation 208 and/or extract just the information that module 210 desires from firmware environment configuration representation 208. For example, if list of authorities 220 includes a list of the authorities that digitally signed components loaded as firmware components 204 in the order those firmware components 204 were loaded, but combination module 210 uses a list of the authorities that each digitally signed at least one of firmware components 204 regardless of which components those one or more authorities digitally signed and regardless of how many components those one or more authorities digitally signed, then combination module 210 can extract the authorities it uses from list of authorities 220 rather than using the authorities in the order in which they are present in list of authorities 220. By way of another example, if firmware environment configuration representation 208 includes revocation record 222 but combination module 210 uses a list of authorities and an operating system loader authority, then combination module 210 can extract list of authorities 220 and operating system loader authority 224 from firmware environment configuration representation 208 and not extract revocation record 222.

In or more embodiments, combination module 210 uses a list of the authorities that each digitally signed at least one of firmware components 204 regardless of which components those one or more authorities digitally signed and regardless of how many components those one or more authorities digitally signed. Combination module 210 sorts the list of authorities (e.g., alphabetically, numerically, according to some other known ordering, and so forth) and uses the sorted list to generate platform secret 212. Combination module 210 can also remove duplicates in the list of authorities if any are present (e.g., if a particular authority is included multiple times in list of authorities 220, combination module 210 can remove the duplicates so that the particular authority is included in list of authorities 220 one time). Thus, in such embodiments platform secret 212 is generated based on the identities of authorities that digitally signed at least one of firmware components 204. The platform secret 212 is thus generated without regard for which firmware components each authority digitally signed, how many firmware components each authority digitally signed, and what order the firmware components 204 were loaded.

In or more other embodiments, combination module 210 uses a list of authorities that digitally signed components loaded as firmware components 204 in the order those firmware components 204 were loaded. Combination module 210 typically does not sort (but alternatively could sort) the list of authorities in such embodiments because the order in which firmware components 204 is loaded is being relied on. Thus, in such embodiments platform secret 212 is dependent on how many firmware components each authority digitally signed and the order in which the firmware components 204 were loaded.

In other embodiments, combination module 210 uses a list of authorities that is the record of acceptable authorities from policy 206. Thus, in such embodiments platform secret 212 is generated based on the authorities that are permitted to verify a component regardless of whether those authorities generated a digital signature for a firmware component.

In one or more embodiments, combination module 210 uses, in addition to or in place of list of authorities 220 and/or revocation record 222, operating system loader authority 224. Thus, in such embodiments platform secret 212 is generated based on the authority that digitally signed the operating system loader, allowing different platform secrets to be generated for different operating systems even if the firmware components 204 and/or policy 206 are the same for the different operating systems. Operating system loader authority 224 can optionally be appended to an identified place of (e.g., the end of) list of authorities 220, or included as an authority (e.g., the last authority) in list of authorities 220.

Combination module 210 also uses a device secret 214, which is a secret of the device implementing system 200 and that is different for (or has greater than a threshold chance of being different for) different devices. In one or more embodiments, device secret 214 is included in a device using multiple fuses (e.g., on the order of a couple hundred) in a processor, and a particular binary key value is encoded by blowing or not blowing various ones of those fuses. Alternatively, device secret 214 can be included in a device in other manners, such as in another hardware component other than the processor, using hardware components other than fuses, and so forth. Device secret 214 is typically protected, being accessible to firmware components 204 but not to other components (e.g., not to operating system kernel 106 of FIG. 1). Device secret 214 can be protected in different manners, such as being retrieved via an interface that is only accessible to firmware components, being accessible only until a value is written to a particular location and then being inaccessible (e.g., combination module 210 writes to the particular location after retrieving device secret 214), being indirectly accessible (e.g., used as an authorization value to unlock or unseal another key on system 200), and so forth.

Combination module 210 combines firmware environment configuration representation 208 and device secret 214 to generate platform secret 212. Combination module 210 can combine firmware environment configuration representation 208 and device secret 214 using various combination processes or techniques. In one or more embodiments firmware environment configuration representation 208 is a list of various identifiers, device secret 214 is added to (e.g., appended to the beginning or end of) firmware environment configuration representation 208, and the resultant value is input to a message authentication code (MAC) or hash-based message authentication code (HMAC), or other key derivation function. For example, the combination process can use DES3-CBC-MAC (Triple Data Encryption Standard Cipher Block Chaining Message Authentication Code), HMAC with SHA-1 (Secure Hash Algorithm 1), and so forth. The output of the HMAC is platform secret 212. Alternatively, the combination process can take other forms, such as adding device secret 214 to (e.g., appending to the beginning or end of) firmware environment configuration representation 208, and provide the resultant value to another component as an authorization value to unlock or permit retrieval of a key that is platform secret 212.

Furthermore, combination module 210 can use as a value in the combination process a value received from another entity (e.g., combining the value with list of authorities 208 in an analogous manner to device secret 214 being combined with list of authorities 208). For example, in a corporate environment, an enterprise value may be provided to combination module 210, the enterprise value serving to distinguish the environment the device is in (e.g., a particular domain, network, etc.) from other environments. This enterprise value can be provided in different manners, such as being a pre-execution environment variable or other value provided by a server or service of a corporate network, being provided by a corporate network administrator, and so forth. This enterprise value allows platform secret 212 to be based on the particular corporate environment, so that even if the device secret 214 were somehow discovered, and firmware environment configuration representation 208 was known, platform secret 212 could still not be generated without this enterprise value.

Platform secret 212 is a secret that is tied to both a particular device secret and the configuration of the firmware environment. Platform secret 212 can be readily regenerated for subsequent boots that include the same firmware environment configuration representation. For example, assume firmware environment configuration representation 208 includes a list of authorities 220 that is a list of the authorities that each digitally signed at least one of firmware components 204 regardless of which components those one or more authorities digitally signed and regardless of how many components those one or more authorities digitally signed. If an additional firmware component digitally signed by another authority not in the list of authorities were to be loaded as a firmware component, a different platform secret would be generated due to the list of authorities changing. Similarly, if the same firmware components were to be loaded on a different device, a different platform secret would be generated due to the device secret changing. However, if a component publisher were to publish a new version of a firmware component that is digitally signed by the same authority as the previous version of that firmware component, then the same platform secret 212 would be generated.

Platform secret 212 can be provided to various different components and/or used in various manners. For example, platform secret 212 can be used as a basis for generating one or more additional keys used for encryption and/or decryption, for retrieving one or more additional keys used for encryption and/or decryption, and so forth. These keys can include public keys, private keys, and/or symmetric keys. In one or more embodiments, platform secret 212 is provided to an operating system loader (e.g., operating system loader 104 of FIG. 1), which uses platform secret 212 to generate one or more keys to encrypt and decrypt data. The operating system loader can keep platform secret 212 protected so that other components cannot access platform secret 212, or alternatively the operating system loader can delete platform secret 212 after the operating system loader generates the one or more keys.

In or more embodiments, the operating system kernel supports encrypting data on storage volumes (e.g., storage devices used by the device that includes system 200) using one or more volume keys. The operating system loader uses the platform secret to generate a public/private key pair, and then deletes both the platform secret and the private key before executing the operating system kernel. Although the operating system kernel has no knowledge of the platform secret or the private key, the operating system kernel can use the public key to encrypt the one or more volume keys. The encrypted one or more volume keys can then be stored (e.g., on a disk, in Flash memory, etc.). On a subsequent boot, the operating system loader regenerates the same public/private key pair, and uses the private key to decrypt the one or more volume keys, which can be provided to the operating system kernel. Thus the volume keys are protected, but can readily be regenerated on subsequent boots.

Platform secret 212 can be regenerated for subsequent boots, so long as firmware environment configuration representation 208 (or at least the part of firmware environment configuration representation 208 used by combination module 210) and device secret 214 do not change. Thus, other components such as the operating system loader do not need to persist the keys they generate across multiple boots. Rather, these other components can simply regenerate the keys based on the platform secret during subsequent boots, and thus need not be concerned with securely persisting such keys.

Additional information regarding firmware components 204 can also optionally be maintained. This additional information can be maintained in firmware environment configuration representation 208 and/or in one or more other records or lists. Various different additional information can be maintained, such as which part of policy 206 each firmware component complies with. For example, an indication of the particular criteria that was complied with to verify the component (e.g., the particular authority that digitally signed the component). This additional information can be maintained (e.g., in a secure manner) and accessed by other modules or components, such as operating system loader 104 and/or operating system kernel 106 of FIG. 1). Maintaining this additional information allows such other modules or components to later view a log of which firmware components were loaded as well as other information, such as the particular criteria that was complied with to verify the component. This additional information can also be used by combination module 210 in generating platform secret 212 (e.g., this additional information can be appended to or otherwise combined with list of authorities 220, revocation record 222, operating system loader authority 224, and/or authority modification list 226).

Figure 5:
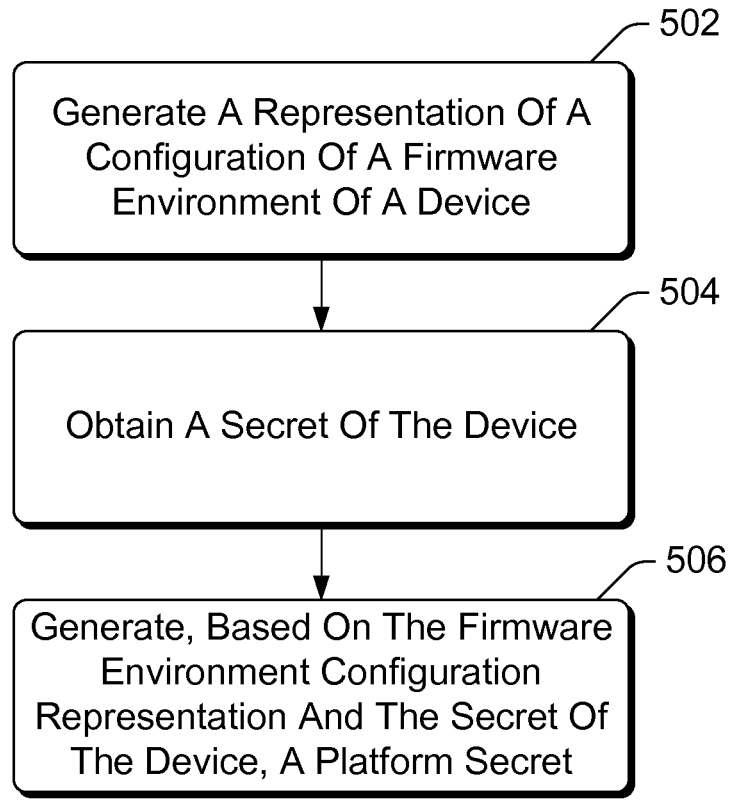
FIG. 5 is a flowchart illustrating an example process for generating a digital signing authority dependent platform secret in accordance with one or more embodiments.

FIG. 5 is a flowchart illustrating an example process 500 for generating a digital signing authority dependent platform secret in accordance with one or more embodiments. Process 500 is carried out by a device, such as device 100 of FIG. 1, and can be implemented in software, firmware, hardware, or combinations thereof. Process 500 is typically carried out by one or more firmware components (e.g., firmware 102 of FIG. 1 or firmware 204 of FIG. 2). Process 500 is shown as a set of acts and is not limited to the order shown for performing the operations of the various acts. Process 500 is an example process for generating a digital signing authority dependent platform secret; additional discussions of generating digital signing authority dependent platform secret are included herein with reference to different figures.

In process 500, a representation of a configuration of a firmware environment of a device implementing process 500 is generated (act 502). This representation can include various information as discussed above.

A secret of the device is obtained (act 504). This secret can be included in the device in different manners as discussed above.

Based on the firmware environment configuration representation and the secret of the device, a platform secret is generated (act 506). The platform secret can be generated in different manners as discussed above, such as by combining the firmware environment configuration representation and the secret of the device.

Figure 6:
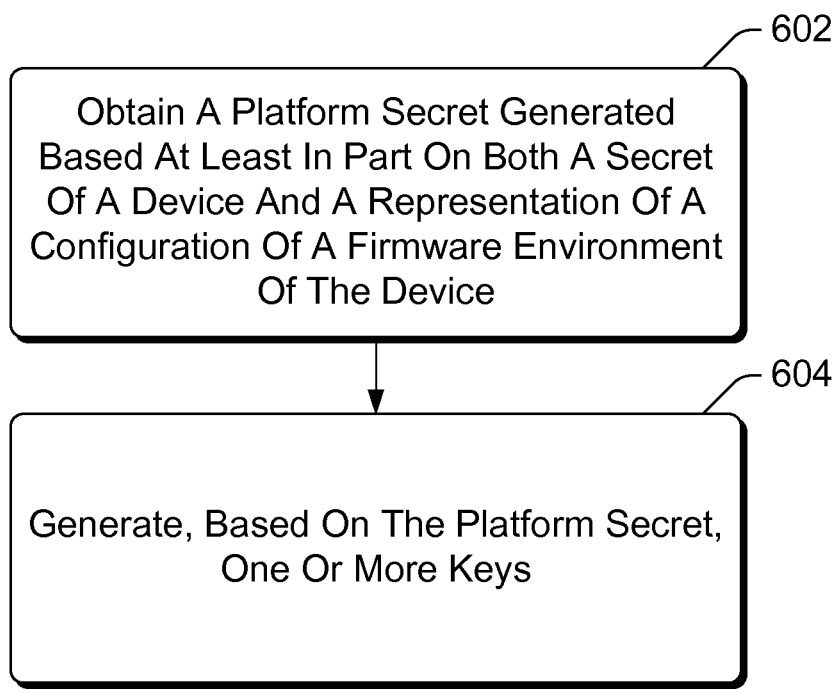
FIG. 6 is a flowchart illustrating an example process for using a digital signing authority dependent platform secret in accordance with one or more embodiments.

FIG. 6 is a flowchart illustrating an example process 600 for using a digital signing authority dependent platform secret in accordance with one or more embodiments. Process 600 is carried out by a device, such as device 100 of FIG. 1, and can be implemented in software, firmware, hardware, or combinations thereof. Process 600 is typically carried out by an operating system loader (e.g., operating system loader 104 of FIG. 1). Process 600 is shown as a set of acts and is not limited to the order shown for performing the operations of the various acts. Process 600 is an example process for using a digital signing authority dependent platform secret; additional discussions of using a digital signing authority dependent platform secret are included herein with reference to different figures.

In process 600, a platform secret is obtained (act 602). The platform secret is generated based at least in part on both a secret of a device and a representation of a configuration of a firmware environment of the device, as discussed above.

Based on the platform secret, one or more keys are generated (act 604). Different keys can be generated as discussed above. Additionally, after generation of the one or more keys, the platform secret can be deleted as discussed above.

The digital signing authority dependent platform secret techniques discussed herein support various usage scenarios. The generated platform secret can be generated based on a list of authorities, thus allowing some changes to the firmware components without altering the platform secret. This allows, for example, publishers to alter their firmware components to fix bugs, add new features, and so forth, and not have those alterations result in a change to the platform secret. Furthermore, depending on the list of authorities used, the publisher may be able to add in new firmware components and/or have the order in which firmware components are altered without having such addition or re-ordering result in a change to the platform secret. In addition, the generated platform secret can be generated based at least in part on an authority that digitally signed an operating system loader, allowing different operating systems to run on the device using the same firmware components, but having different platform secrets and thus preventing each operating system from reading the other's secrets.

Figure 7:
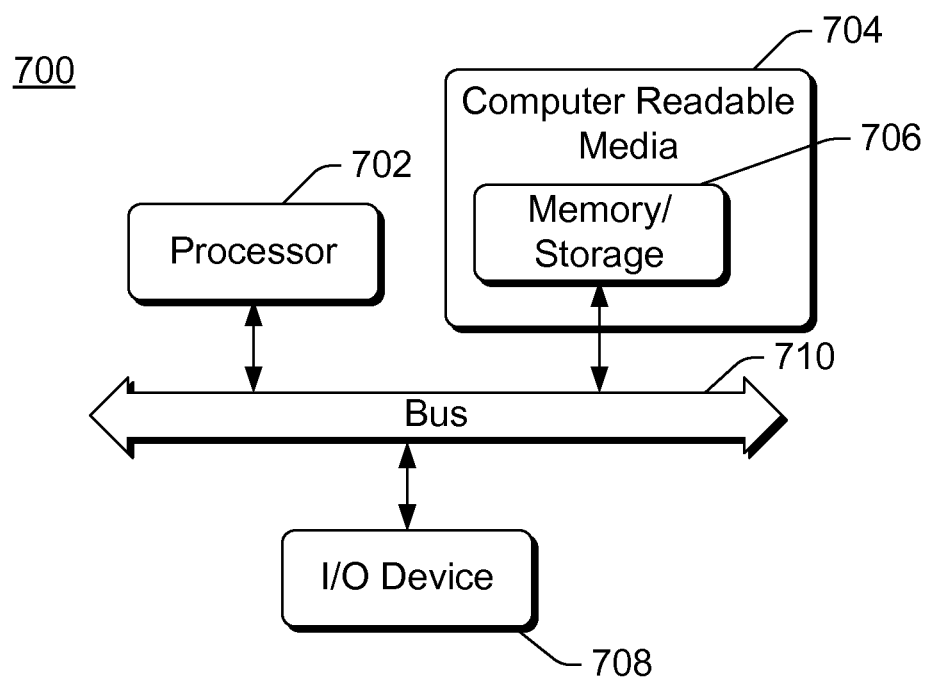
FIG. 7 illustrates an example computing device that can be configured to implement the digital signing authority dependent platform secret in accordance with one or more embodiments.

FIG. 7 illustrates an example computing device 700 that can be configured to implement the digital signing authority dependent platform secret in accordance with one or more embodiments. Computing device 700 can be, for example, device 100 of FIG. 1.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Processor 702, computer readable media 704, one or more of devices 708, and/or bus 710 can optionally be implemented as a single component or chip (e.g., a system on a chip). Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. In the case of hardware implementation, the module or component represents a functional block or other hardware that performs specified tasks. For example, in a hardware implementation the module or component can be an application-specific integrated circuit (ASIC), field-programmable gate array (FPGA), complex programmable logic device (CPLD), and so forth. The features of the digital signing authority dependent platform secret techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   generating, in a device, a representation of a configuration of a firmware environment of the device;
   obtaining a secret of the device; and
   generating, based on both the firmware environment configuration representation and the secret of the device, a platform secret such that a same platform secret is generated for firmware environments having different versions of a firmware component.

2. A method as recited in claim 1, the firmware environment configuration representation including a list of authorities identifying one or more authorities that digitally signed firmware components that were loaded on the device regardless of which firmware components those one or more authorities digitally signed and regardless of how many firmware components those one or more authorities digitally signed.

3. A method as recited in claim 1, the firmware environment configuration representation including an identification of one or more authorities that are permitted to modify a list of acceptable authorities that can digitally sign firmware components loaded on the device.

4. A method as recited in claim 1, the firmware environment configuration representation including a list of one or more authorities that digitally signed firmware components that were loaded on the device, and including at an identified place of the list of authorities an identifier of an authority that digitally signed an operating system loader loaded on the device.

5. A method as recited in claim 1, the firmware environment configuration representation including a list of authorities identifying one or more authorities that are permitted, based on a policy of the device, to have particular firmware components that are digitally signed by the one or more authorities loaded on the device regardless of whether the particular firmware components were loaded on the device.

6. A method as recited in claim 1, the firmware environment configuration representation including identifiers of authorities that are not permitted to verify a firmware component.

7. A method as recited in claim 1, the firmware environment configuration representation including identifiers of particular firmware components that are not permitted to be loaded.

8. A method as recited in claim 1, the generating the platform secret comprising using the firmware environment configuration representation and the secret of the device as inputs to a key derivation function, and using the output of the key derivation function as the platform secret.

9. A method as recited in claim 1, the generating the platform secret further comprising generating the platform secret based at least in part on an enterprise value that distinguishes the environment in which the device is located from other environments.

10. A method as recited in claim 1, the secret of the device being encoded in multiple fuses of a processor of the device.

11. A computing device comprising:
    one or more processors; and
    one or more computer storage media having stored thereon multiple instructions that, when executed by the one or more processors, cause the one or more processors to:
       obtain, in the computing device, a platform secret generated based at least in part on both a secret of the computing device and a representation of a configuration of a firmware environment of the computing device, the platform secret being usable by an operating system loader of the computing device to generate one or more keys before executing an operating system kernel; and
       generate, based on the platform secret, one or more keys.

12. A computing device as recited in claim 11, the multiple instructions further causing the one or more processors to regenerate, based on the platform secret, the one or more keys on subsequent boots of the computing device rather than persisting the one or more keys across boots.

13. A computing device as recited in claim 11, the multiple instructions further causing the one or more processors to use the platform secret as an authorization value to unlock another key.

14. A computing device as recited in claim 11, the one or more keys comprising a public/private key pair, the instructions further causing the one or more processors to:
    generate a volume key used to encrypt data on a storage volume of the computing device;

encrypt the volume key with a private key of the public/private key pair;
store the encrypted volume key;
delete the private key of the public/private key pair; and
delete the platform secret.

15. A computing device as recited in claim 11, the firmware environment configuration representation including a list of authorities identifying one or more authorities that digitally signed firmware components that were loaded on the computing device regardless of which firmware components those one or more authorities digitally signed and regardless of how many firmware components those one or more authorities digitally signed.

16. A computing device as recited in claim 11, the firmware environment configuration representation including a list of authorities identifying one or more authorities that digitally signed firmware components that were loaded on the computing device in the order in which the firmware components were loaded on the computing device.

17. A computing device as recited in claim 11, the firmware environment configuration representation including identifiers of authorities that are not permitted to verify a firmware component.

18. A computing device as recited in claim 11, the firmware environment configuration representation including identifiers of particular firmware components that are not permitted to be loaded.

19. A computing device as recited in claim 11, the platform secret further generated based at least in part on an enterprise value that distinguishes the environment in which the computing device is located from other environments.

20. A method comprising:
generating, in a device, a list of authorities that digitally signed firmware components loaded on the device, the list of authorities identifying one or more authorities that digitally signed firmware components that were loaded on the device regardless of which firmware components those one or more authorities digitally signed and regardless of how many firmware components those one or more authorities digitally signed;
obtaining a secret of the device;
generating, by applying a key derivation function to a combination of both the list of authorities and the secret of the device, a platform secret specific to a particular operating system resulting in different platform secrets being generated for different operating systems despite at least some of the firmware components of the different operating systems being the same; and
generating, based on the platform secret, one or more volume keys used to encrypt data on a storage volume of the device.

* * * * *